US009438984B1

(12) United States Patent
Ryann

(10) Patent No.: US 9,438,984 B1
(45) Date of Patent: Sep. 6, 2016

(54) WEARABLE ELECTRONIC PIECES AND ORGANIZER

(71) Applicant: William F. Ryann, San Antonio, TX (US)

(72) Inventor: William F. Ryann, San Antonio, TX (US)

(*) Notice: Subject to any disclaimer, the term of this patent is extended or adjusted under 35 U.S.C. 154(b) by 336 days.

(21) Appl. No.: 13/943,071

(22) Filed: Jul. 16, 2013

Related U.S. Application Data

(63) Continuation-in-part of application No. 13/065,577, filed on Mar. 24, 2011, now abandoned, which is a continuation-in-part of application No. 12/384,871, filed on Apr. 9, 2009, now abandoned, which is a (Continued)

(51) Int. Cl.
H04R 25/00 (2006.01)
H04R 1/10 (2006.01)
H04R 25/02 (2006.01)

(52) U.S. Cl.
CPC ............ *H04R 1/105* (2013.01); *H04R 1/1066* (2013.01); *H04R 1/1041* (2013.01); *H04R 25/02* (2013.01)

(58) Field of Classification Search
CPC .. H04R 1/105; H04R 1/1016; H04R 1/1041; H04R 1/1066; H04R 25/65; H04R 25/02; H04R 2225/021; H04R 2225/63; H04M 1/6058; H04M 1/6066; H04M 1/0258
See application file for complete search history.

(56) References Cited

U.S. PATENT DOCUMENTS 4,827,525 A * 5/1989 Hotvet .................. H04R 25/60 381/60
D334,855 S 4/1993 Harrington
5,457,751 A * 10/1995 Such ....................... H04M 1/05 348/115

(Continued)

FOREIGN PATENT DOCUMENTS

CN 2504843 8/2002
GB 2 402835 12/2004
WO WO 2005/053352 A1 6/2005

OTHER PUBLICATIONS

U.S. Appl. No. 95/002,107, filed Aug. 2012, Ryann.

(Continued)

*Primary Examiner* — Matthew Eason

(57) ABSTRACT

An organizer for wearable electronic pieces or wireless communication jewelry. The pieces may be of an enhanced ergonomic form, particularly suitable for long-term wear. For example, a uniquely located actuator may be provided and each piece may be configured to distribute a significant portion of its bulk away from the isolated location of a user's ear without sacrifice to audio or communicational integrity. Further, the securing extension that accommodates the actuator and secures the piece to the user's ear may occupy less than about 0.25 inches in width behind the user's ear. Additionally, the organizer manages unique protocols of recharge for a potential plurality of pieces. Additionally, charging takes place through a support mechanism which accommodates a discrete securing extension portion of a piece in a substantially matching fashion. Further, a casing of the piece is substantially displaced from the accommodating location. A charging device of the organizer is coupled to the support mechanism such that recharge of the piece may take place through a charge region of the discrete portion of the piece. Notably, the organizer is configured in such a manner that a plurality of pieces may be secured and recharged without the need for an individually dedicated and/or wire-based recharger for each and every piece in a collection of pieces.

20 Claims, 10 Drawing Sheets

Related U.S. Application Data continuation-in-part of application No. 11/218,860, filed on Sep. 2, 2005, now Pat. No. 7,536,150, which is a continuation-in-part of application No. 11/218,391, filed on Aug. 29, 2005, now abandoned, and a continuation-in-part of application No. 11/218,392, filed on Aug. 29, 2005, now Pat. No. 7,505,793.

(60) Provisional application No. 61/735,174, filed on Dec. 10, 2012.

(56) References Cited

U.S. PATENT DOCUMENTS

| | | | | |
|---|---|---|---|---|
| D372,312 | S | 7/1996 | Lange | |
| 5,606,621 | A * | 2/1997 | Reiter | H04R 25/456 381/328 |
| 5,721,783 | A | 2/1998 | Anderson | |
| 6,005,304 | A | 12/1999 | Seelig | |
| 6,032,486 | A | 3/2000 | Uchin | |
| 6,091,546 | A | 7/2000 | Spitzer | |
| 6,091,832 | A | 7/2000 | Shurman | |
| 6,424,820 | B1 | 7/2002 | Burdick | |
| 6,490,362 | B1 * | 12/2002 | Clegg | H04R 1/083 379/430 |
| 6,493,453 | B1 * | 12/2002 | Glendon | H04R 23/008 381/322 |
| 6,603,863 | B1 * | 8/2003 | Nagayoshi | H04R 1/1066 381/370 |
| 6,658,124 | B1 | 12/2003 | Meadows | |
| 6,735,306 | B1 | 5/2004 | Heinz | |
| 6,760,459 | B2 | 7/2004 | Bae | |
| 6,764,133 | B2 | 7/2004 | Osato | |
| 6,810,987 | B1 | 11/2004 | DeKalb | |
| 6,819,772 | B2 | 11/2004 | Amae | |
| 6,823,171 | B1 | 11/2004 | Kaario | |
| 6,868,284 | B2 | 3/2005 | Bae | |
| 6,906,495 | B2 | 6/2005 | Cheng | |
| 7,013,018 | B2 | 3/2006 | Bogeskov-Jensen | |
| 7,031,485 | B2 | 4/2006 | Webber | |
| 7,042,196 | B2 | 5/2006 | Ka-Lai | |
| 7,109,602 | B2 | 9/2006 | Nishino | |
| 7,211,986 | B1 | 5/2007 | Flowerdew | |
| 7,239,110 | B2 | 7/2007 | Cheng | |
| 7,389,868 | B2 | 6/2008 | Lewand | |
| 7,505,793 | B2 * | 3/2009 | Ryann | H04M 1/05 381/314 |
| 7,536,150 | B2 * | 5/2009 | Ryann | H04M 1/05 379/330 |
| 7,539,525 | B2 | 5/2009 | Kim | |
| 7,948,208 | B2 | 5/2011 | Partovi | |
| 8,094,850 | B2 * | 1/2012 | Feeley | H04R 25/60 381/322 |
| 9,084,054 | B2 * | 7/2015 | Prelogar | H04R 1/105 |
| 2001/0002928 | A1 | 6/2001 | Cummins | |
| 2003/0134666 | A1 | 7/2003 | Fletcher | |
| 2003/0211871 | A1 | 11/2003 | Nassimi | |
| 2004/0000848 | A1 | 1/2004 | Greiner | |
| 2004/0066948 | A1 | 4/2004 | Bogeskov-Jensen | |
| 2004/0198391 | A1 | 10/2004 | Sanders | |
| 2004/0202339 | A1 | 10/2004 | O'Brien | |
| 2004/0239874 | A1 | 12/2004 | Swab | |
| 2005/0018838 | A1 | 1/2005 | Meunier | |
| 2005/0046789 | A1 | 3/2005 | Jannard | |
| 2005/0046790 | A1 | 3/2005 | Jannard | |
| 2005/0107131 | A1 * | 5/2005 | Abramov | H04M 1/0258 455/569.1 |
| 2005/0143140 | A1 | 6/2005 | Sanders | |
| 2005/0154593 | A1 | 7/2005 | Denatale | |
| 2005/0207588 | A1 * | 9/2005 | Biegelsen | H04R 1/403 381/77 |
| 2006/0039577 | A1 | 2/2006 | Sanguino | |
| 2006/0043927 | A1 | 3/2006 | Beart | |
| 2006/0166705 | A1 | 7/2006 | Seshadri | |
| 2007/0009120 | A1 | 1/2007 | Algazi | |
| 2007/0049351 | A1 * | 3/2007 | Ryann | H04M 1/6066 455/569.1 |
| 2007/0049362 | A1 * | 3/2007 | Ryann | 455/575.2 |
| 2007/0058831 | A1 * | 3/2007 | Rie | H04R 1/105 381/374 |
| 2007/0141860 | A1 | 6/2007 | Hernandez | |
| 2007/0149261 | A1 * | 6/2007 | Huddart | H04R 5/033 455/575.2 |
| 2007/0159371 | A1 | 7/2007 | Song | |
| 2008/0067874 | A1 | 3/2008 | Tseng | |
| 2008/0234009 | A1 | 9/2008 | Zeiger | |
| 2011/0170723 | A1 * | 7/2011 | Ryann | A44C 7/00 381/322 |
| 2014/0098983 | A1 * | 4/2014 | Clow | H04R 1/1091 381/375 |
| 2015/0110319 | A1 * | 4/2015 | Mimbs | H04R 25/02 381/322 |

OTHER PUBLICATIONS

User Manual, Bluetrek ST1; 2006.
Quick Start Guide, Motorola S9; 2007.
User Manual, Motorola S9; 2007.
Quick Start Guide, Motorola S9-HD; 2008.
Motorola S10-HD Fact Sheet; 2010.
User Manual, Samsung SBH700; 2008.
Quick Start Guide, Samsung SBH700; 2008.
Spec Sheet, Samsung SBH700; 2008.
User Guide, Nokia BH-505; 2010.
User Guide, NuForce BT Sport; 2010.

* cited by examiner

WEARABLE ELECTRONIC PIECES AND ORGANIZER

BACKGROUND

Over the years, a variety of systems have been developed for accommodating conventional jewelry in an organized and/or displayed manner. For example, rather than leave necklaces, bracelets, rings and earrings strewn about a bedside table, jewelry boxes are commonly utilized for organized storage of such pieces. Jewelry boxes, display cases and the like are often configured in a manner that also provides a degree of presentation. For example, upon opening of a conventional jewelry box, a stair step presentation of different pieces may be apparent along with a mirror and other features that enhance overall display. These same features not only enhance the display of the pieces but may additionally enhance user interaction therewith. Along these lines, the noted mirror, and organized placement of different types of pieces, earrings in one location, rings in another, further aid in user interaction.

With the benefits of jewelry organization in mind, systems beyond standard jewelry boxes have also been developed. For example, depending on a user's jewelry-related priorities, hanging bags with transparent pockets, may be utilized. Thus, similar to a conventional hanging shoe storage organizer, different jewelry pieces, sunglasses, etc., may be organized in individual pockets of a hanging bag adjacent other apparel in a closet. Alternatively, more elaborate mounted jewelry cabinets may even be utilized that allow the user to open a door and simultaneously view jewelry and the user's self in a mirror when putting together a 'look' for the day. Indeed, where a maximum of open display is sought, stand-alone earring trees may even be utilized which provide an appearance similar to miniature Christmas bulbs on a bonsai tree.

In recent years the conventional concept of jewelry has evolved from the noted rings, earrings, necklaces and such into functional wearable communication devices. Fore example, Bluetooth earpieces, headsets and other 'wearables' that combine the aesthetics of jewelry with powered wireless or computing functional capacity. Indeed, an emergence in jewelry-like design and focus is particularly noticeable in the case of Bluetooth earpieces. Along these lines, a stylized fashion-oriented focus is seen in certain earpiece models available from various distributors. Even 'bedazzling' of earpieces is beginning to emerge.

Such fashionable, jewelry-like focus has also extended to other wearables, such as products which combine the concept of a necklace with that of a Bluetooth headset. Additionally, a host of different unitary bifocal/video eyewear and stereo earwear devices have been developed which include fashion-focused design. Ultimately, whatever types of wearables are selected, many of the same aesthetic considerations are accounted for by the user that are considered when selecting more conventional jewelry.

Unfortunately, unlike more conventional jewelry, organization, storage and presentation systems are largely lacking for emerging wearable devices. This may be due in part to the newer morphologies of such devices. However, it is also due to the fact that, unlike conventional jewelry, wearable electronic devices are powered. Thus, when not in use, these devices are generally plugged into a dedicated recharging power source. So, for example, while it may be possible to place a wearable in a jewelry box for sake of organization, such would sacrifice the overnight recharging thereof.

This problem may be particularly noticeable in the case of Bluetooth earpieces. These devices are smaller and potentially more numerous than other wearables in any given accessory collection. Yet, at the same time, each separate earpiece is generally afforded its own dedicated recharger. So, for example, as a user seeks to expand the earpiece collection, perhaps for sake of fashion, a jumbled mess of wires begins to grow at the bedside table, next to the jewelry box or elsewhere. Thus, in comparison to conventional jewelry, there's not only a lack of available organization, but at the same time an inherently greater amount of disorganization at the outset, due to the recharging nature of such wearable devices.

As a practical matter, this problem places the user in the position of sacrificing organization for the sake of ensuring adequate recharge of each and every wearable device following each and every wear. As indicated, this sacrifice is particularly notable in the case of Bluetooth earpieces. In fact, the resulting inherent level of disorganization may actually serve as an impediment to the user expanding such collection, thereby further sacrificing fashion in addition to organization.

SUMMARY

An organizer is provided for accommodating a plurality of wearable communication devices or pieces such as wireless jewelry, earpieces, Bluetooth headsets and the like. The organizer includes a support mechanism for accommodating any practical number of wireless pieces of the plurality. More specifically, the support mechanism is configured to accommodate each piece at the discrete location of a securing extension thereof, the securing extension tuciljtndngvvearofthe piece by the user. Once more, the organizer is equipped with a charging device which is coupled to the support mechanism. As such, delivery of power to the piece via the extension may be achieved.

DETAILED DESCRIPTION

Embodiments of organizers to accommodate a plurality of wearable electronic pieces are detailed herein. These pieces may be wireless, communicative or other types of pieces which are described with reference to certain types of organizational displays. More specifically, wall or horizontal mounted displays are detailed which utilize certain types of support mechanisms and charge/recharging devices, namely of an inductive variety. By the same token, the types of wearable pieces depicted are largely of the wireless earpiece variety. However, alternate, non-inductive forms of charging may be utilized as well as different types of wearable devices or "wireless jewelry pieces" aside from earpieces and/or headsets.

Regardless of the specific recharge—wearable combination, embodiments detailed herein include a support mechanism that accommodates and interfaces a discrete portion of the wearable for sake of power delivery thereto. Furthermore, a protocol of acceptability and organization for charge/recharge management of a variety of different pieces may be uniquely employed. Additionally, each w earable may include a component casing that is substantially displaced from the accommodated support mechanism. Thus, with respect to casing electronics, a heat conscious recharge system may be provided in addition to ergonomically superior wearable pieces as detailed herein.

Figure 1:
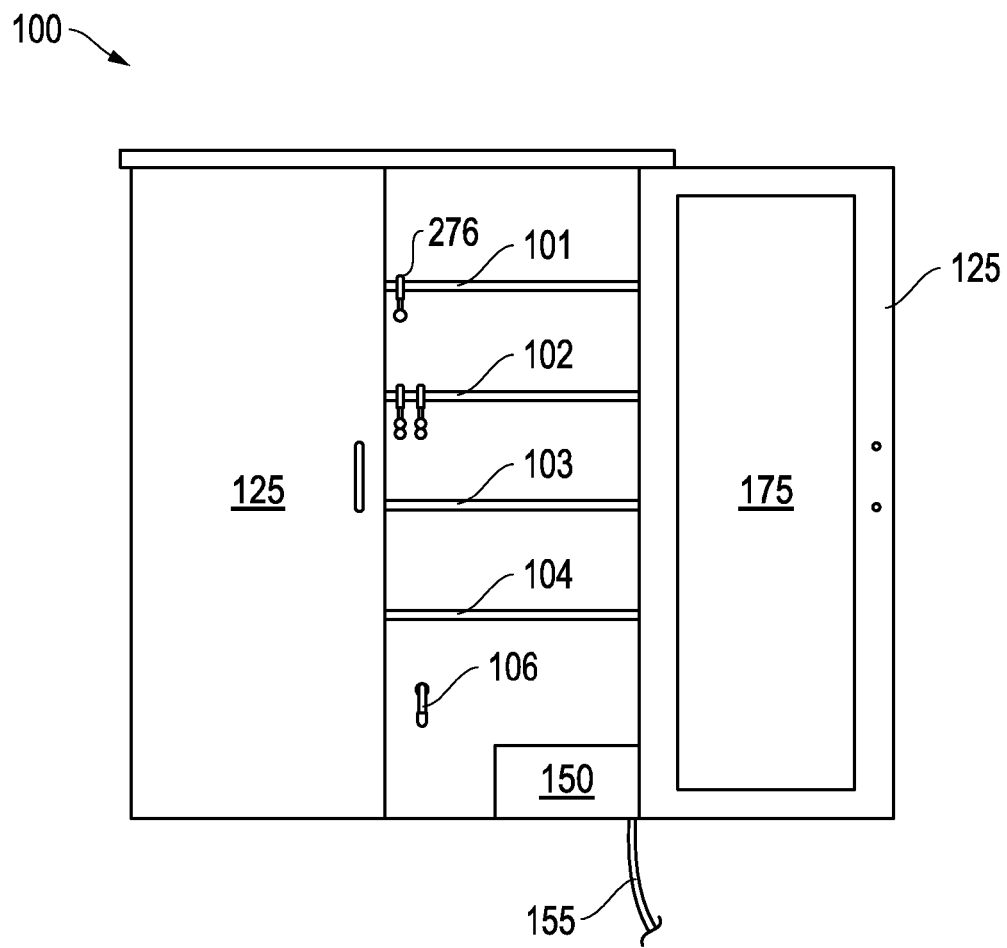
FIG. 1 is a front view of an embodiment of a wall-mounted organizer with support mechanisms and a control unit for a plurality of wearable electronic pieces.

Referring now to FIG. 1, a front view of an embodiment of a wall-mounted organizer 100 is shown. Though, in other embodiments, the organizer 100 need not be of a wall-mounted configuration. The organizer 100 includes a variety of multi-level support mechanisms 101-104, 106 as detailed further below. Again, however, a multi-level configuration is not required, although such may be desirable for sake of presenting an organized manner of display. Regardless, the support mechanisms 101-104, 106 are provided for securely accommodating a plurality of wearable electronic pieces (e.g. 276) for sake of the noted display. Furthermore, a control unit 150 may be provided for sake of governing charge/recharge to any individually accommodated pieces by way of the indicated mechanisms 101-104, 106. For example, note such accommodated pieces 276, 281, 286, 295, 215, 216 at FIGS. 2A and 2B detailed further below.

Power to the organizer 100 and control unit 150 may be provided through an electrical cord 155 running to a conventional wall socket or other suitable power source. The organizer 100 is also of a configuration for enhancing overall presentation and user accessibility. For example, in addition to the multi-level display, the organizer 100 may make use of cabinet doors 125, internal mirrors 175, drawers, pockets, and a variety of additional organizational, aesthetic or other appropriate enhancing features. Indeed, the organizer 100 may serve as an advantageous organizational display system for wearable pieces irrespective of accompanying recharge.

Figure 2A:
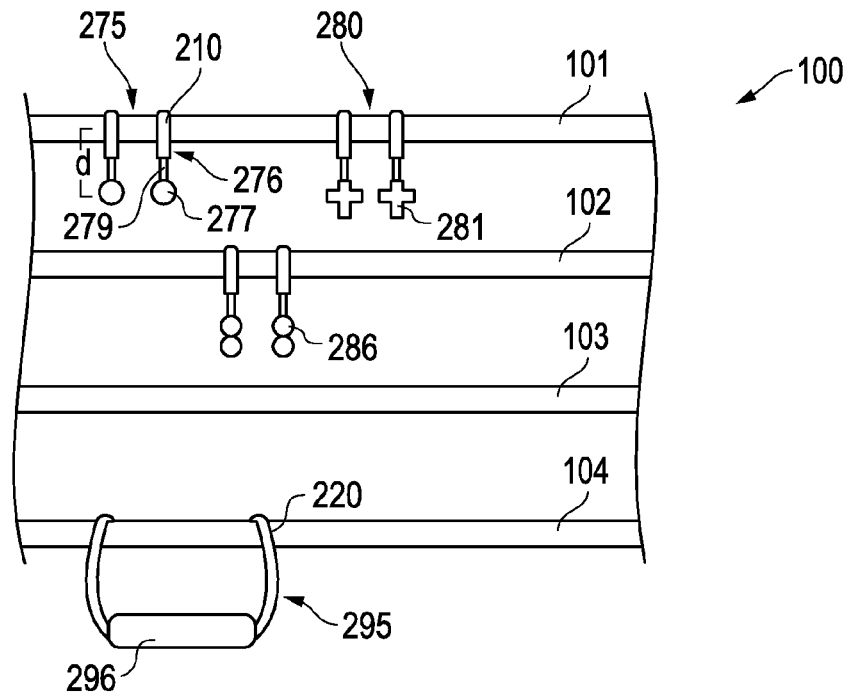
FIG. 2A is an enlarged view of internal multi-level support mechanisms of the organizer of FIG. 1 accommodating a plurality of electronic pieces.
Figure 2B:
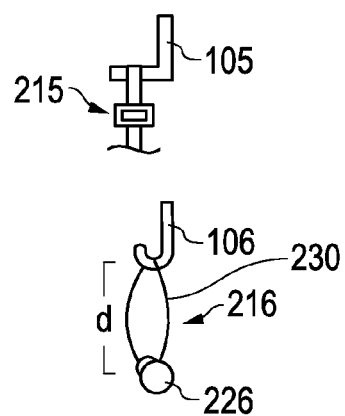
FIG. 2B is a side view of alternate embodiments of support mechanisms of the organizer of FIG. 1 accommodating individual wearable electronic pieces.

Continuing with reference to FIG. 1, with added reference to FIGS. 2A-2B, the control unit 150 may be utilized to govern a predetermined programmable protocol for recharge of pieces at different locations of the organizer 100. More specifically, the unit 150 may include a processor to support communications and analysis relative different accommodated pieces. For example, in one embodiment the organizer 100 may be configured to supply power only when a piece is accommodated at a support mechanism 101-104, 106. Thus, as opposed to switching the organizer 'on' and 'off', a conventional strain gauge, sensor, or other suitable detection technique may be incorporated into each mechanism 101-104, 106.

In this manner, information indicative of detection of a piece may be relayed to the control unit 150 which may responsively govern the powering up of the organizer 100. Such relay of information may be supported by electrical communicative capacity inherent through the mechanisms 101-104, 106 as detailed further below, or through Bluetooth or other wireless protocol with accommodated pieces. Furthermore, such powering up may relate to powering up of the entire organizer 100 or powering up on a more select basis. For example, in one embodiment, detection as described may result in powering up of select mechanisms 101-104, 106 whereat pieces are detectably accommodated, or even powering up just the select locations 275, 280 of mechanisms 101-104, 106 when pieces are accommodated thereat (see FIG. 2A).

In addition to detection for sake of recharge generally, the control unit 150 may also be utilized on a more specific basis for determination of compatibility in governing recharge. So, for example, through supported communications with a microprocessor or suitable identifier of each piece, a processor of the unit 150 may be used to confirm compatibility in advance of any recharge. These communications may take place electrically over the mechanisms 101-104, 106 or via Bluetooth or other wireless protocol as noted above. Thus, where a piece is not compatible with the organizer 100 in terms of recharge, yet placed at a location of a mechanism 101-104, 106, say for sake of organization, the unit 150 may avoid directing a supply of recharge current thereto. Stated another way, a failure of powerable pairing may result between the unit 150/organizer 100 and the piece location.

This type of regulation may take a variety of different forms. For example, in one embodiment, recharge may be prevented in this manner on a piece by piece or even a mechanism by mechanism basis. That is to say, whenever an incompatible piece is detected on a given mechanism 101-104, 106, current supply to that particular mechanism alone will be avoided. Of course, any number of alternate techniques may be employed through the control unit 150 in governing and regulating the recharge. Once more, governing recharge in this manner may be employed as a supplement or alternative to utilizing a mechanical key-like matching between piece and mechanism 101-104, 106 for sake of recharge as detailed further below. A variety of different management techniques for recharge are detailed further hereinbelow, in particular with reference to the flow-chart of FIG. 7.

Referring now to FIGS. 2A and 2B, selectively enlarged views the overall organizer 100 and internal support mechanisms 101-106 are depicted in conjunction with a manner of accommodating a plurality of electronic pieces 276, 281, 286, 295, 215, 216 thereat. That is, as opposed to underlying piece (FIGS. 3A-3C) or engagement (FIGS. 4A-4B) morphologies or even potential recharge techniques (FIGS. 5A-5C, 6A-6B), FIGS. 2A-2B, depict an overview of the organizer 100, as might be seen from a day to day user's perspective.

Specifically, FIG. 2A depicts the main multi-level rod-shaped support mechanisms 101-104 of FIG. 1 accommodating a plurality of certain pieces 276, 281, 286, 295. Alternatively, FIG. 2B depicts a side view of different hook-shaped embodiments of support mechanisms 105, 106 accommodating certain wearable electronic pieces 215, 216 on a more individual basis. More particularly, the hook-shaped embodiments of FIG. 2B include a straight, peg-like support mechanism 105, and another mechanism 106 of a more traditionally curved nature.

In addition to an organized display, the positioning of pieces 276, 281, 286, 295, 215, 216 at the organizer 100 may also provide a strategically convenient platform for charging. That is, the organizer 100 is configured for organized retention and display of stored pieces when not being worn by a user. So, for example, the organizer 100 and wearable piece embodiments herein are largely drawn to inductive techniques for recharging. Though exceptions such as the embodiments of FIGS. 6A-6B and others are available. Nevertheless for inductive recharge embodiments, depending on standard degrees of inductive efficiencies, the potential exists for a considerable amount of heat buildup at recharge locations. Thus, in contrast to more traditional "on-ear" Bluetooth casing configurations, certain embodiments of the wearable pieces 276, 281, 286, 295 may be of a displacing configuration with heat sensitive components in mind. So, for example, a component casing 277, 296 may be translationally displaced a distance (d) to a heat-safe location relative its own extension 210, 220 and charge region 305, 315 thereof (see FIGS. 3A-3B).

As a result of such casing displacement, from a day to day user's perspective, the wearable piece collection may take on the appearance of traditional jewelry-types such as dangling earrings 281, pendant casing necklaces 216 and the like. With added reference to FIGS. 9 and 10, in conjunction with this effect, a component casing 277, which may constitute the bulkiest portion of a given piece, may be substantially displaced for sake of ergonomics, such as to a location between an ear of the user 975 and the user's shoulders or neckline (at the base of the user's neck) when worn. Notice this location with reference to a collar 979 of the user's upper garment 970 (again see FIGS. 9 and 10). The casing 277 may be of a bulk for housing a plurality of electronic components for a given piece 276. Thus, the bulk of the casing 277 is likely to exceed that of a securing extension 210 and distancing element 279, detailed at length below. See also U.S. application Ser. Nos. 13/065,577, 12/384,871, 11/218,860, 11/218,392 and 11/218,391, each of which are incorporated by reference herein, in their entireties.

Along these lines, the pieces (e.g. 276, 295) are constructed of the noted casing 277, 296 and a securing extension 210, 220, among various other portions. Further, the casing 277 and extension 210 of a given piece 276 may be of stable unitary form construction to ensure safeguarding of electronic components within the casing 277 at all times. Therefore, in certain embodiments, unlike a conventional hinged or collapsible Bluetooth earpiece, or one of on-ear casing design, the user friendly organizer 100 may be of enhanced practicality. That is, the hook-like extension 210 with displaced casing 277, yet overall refined unitary piece 276, is uniquely hung and stably sustained at a mechanism 101 thereof.

Continuing with reference to FIGS. 2A and 3A-3C (with some added reference to FIG. 5A), such heat conscious pieces 276, 295 may utilize securing extensions 210, 220, 230 for sake of placement as indicated. Further, the extensions 210, 220, 230 may house an internal inductor 500 at charge regions thereof, in a manner distanced from component casings 277, 296, 226 of the pieces 276, 295, 216. A given component casing 277 may be configured for housing wireless electronics such as a microprocessor, transceiver, microphone, battery, etc., some of which may be heat sensitive in nature. In particular, the microphone may be a focused microphone and the battery well-suited for inductive recharge as detailed below. However, in addition to incorporating conventional insulating materials, the casing 277 may be displaced or distanced (d) from the heat prone location of the charge region 305 and inductor 500, or the center of the mechanism 101 generally, as alluded to above. Thus, a manner of heat sensitive safeguarding may be provided to such components. For example, in one embodiment, this distance (d) is over 1.5 inches between the charge region 305 and casing 277, preferably two or more inches.

In another manner of examining the earpiece 276, the length of a casing support or distancing element 279, between the extension 210 and the casing 277, may be over about 0.25 inches so as to ensure adequate safeguarding for noted heat sensitive components when placed at the organizer 100 and, in certain embodiments, under about 5 inches for positioning of the casing 277 between the user's ear and neckline when worn as noted hereinabove. Regardless, a heat safe (or 'safer') distance between the casing 277 and the inductor 500 (or extension 210) is ensured, in contrast to pieces lacking such component casing displacement. Utilization of casing insulation and displacement in this manner allows for more practical use of an organizer 100 of such increased user friendliness. That is, readily manipulatable and display enhancing, exposed support mechanisms 101-106 may be rendered a practical recharging platform option when combined with wearables of such displacing morphologies.

Continuing with specific reference to FIG. 2A, a portion of an organizer 100 is shown utilizing multiple support mechanisms 101-104, for example, at a back wall, door, or other suitable location of a jewelry-like, wall-mountable case as depicted in FIG. 1. The mechanisms 101-104 allow for a plurality of different wearable communication pieces 276, 281, 286, 295 to be accommodated of varying styles and types. In the embodiment shown, this may include earpieces or 'ear wear' with displaced casings resembling single ear earrings 276, 281, 286 or unitary dual ear headsets 295. Regardless, an organized jewelry-like display of wearable communication pieces is provided as noted above, that is heretofore unseen. Once more, as detailed below, simultaneous charging of the pieces may be achieved without the requirement of their individual removal from the organizer 100 for pairing to a dedicated charger.

With particular reference to FIG. 2B, side views of alternate embodiments of support mechanisms 105, 106 are depicted. That is, as opposed to rod-shaped mechanisms 101-104 as described above, hook-shaped support mechanisms 105, 106 may be utilized with the organizer 100. Such shapes may serve as a platform tailored for accommodating wearable pieces more on an individual basis as opposed to say, accommodating several pieces along a single rod-shaped support mechanism 101 as in FIG. 2A. Nevertheless, such support mechanisms 105, 106 may be incorporated into the organizer 100 to further aid in supporting a plurality of wearable pieces (see FIG. 1). Further, these mechanisms 105, 106 may again serve as platforms for charging of such pieces so as to avoid the requirement of their individual removal and pairing to a dedicated charger.

Continuing with reference to FIG. 2B, support mechanisms may include straight, peg-like hooks 105 similar to pegs of a board for accommodating keys at a valet, garage, behind a concierge desk, etc. More traditional curved hooks 106 may also serve as support mechanisms with shapes similar to those commonly utilized to hang hats and other apparel. Indeed, along these lines, eye hook shapes and others may also be utilized. As noted above, hook-shaped support mechanisms 105, 106 may be particularly well suited for accommodating pieces of the organizer 100 on an individual basis.

Given that hook-shaped support mechanisms 105, 106 may be naturally open-ended, wearable pieces utilizing securing extensions that form a closed-loop when worn by a user may be well suited for placement at such mechanisms 105, 106 of an organizer 100. Indeed, as shown, pieces configured for wrist 215 or neck 216 wear during use may be hung on hook-shaped support mechanisms 105, 106 while leaving their securing extension straps closed. Of course, such placement is a matter of user choice in that individualized placement for such pieces is not required. For example, wrist 215 or neck 216 worn pieces may be opened and placed at a rod-shaped mechanism 101, whether re-closed or otherwise. Indeed, a normally closed-loop piece 215, 216 (during user wear) may even be opened and yet placed at a hook-shaped support mechanism 105, 106. For example, a strap of a wrist piece 215 may be secured to a peg-type hook 105 with a buckle or fastener thereof, particularly where a conformal or matching interface is achieved as detailed further below. Further, so long as this discrete portion of the piece 215 includes at least an underlying conductive capacity as detailed below, recharge thereof may be achieved by way of the organizer 100.

Figure 3A:
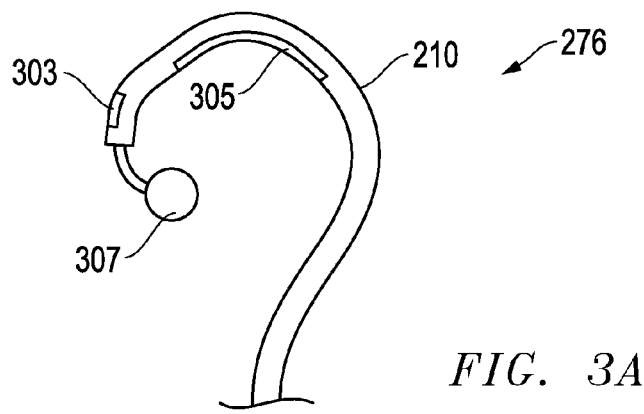
FIG. 3A is a side view of a portion of an embodiment of a wearable communication piece in the form of a single ear earpiece for use with the organizer.
Figure 3B:
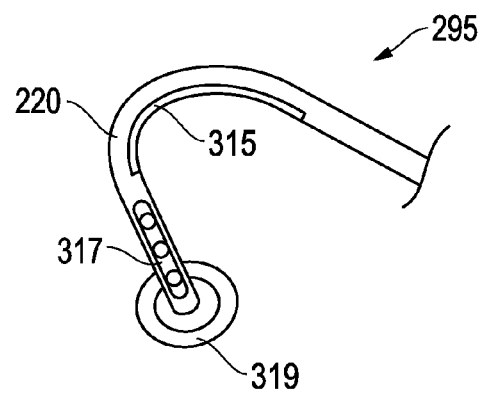
FIG. 3B is a side view of a portion of an alternate embodiment of a wearable piece in the form of a dual ear earpiece for use with the organizer.
Figure 3C:
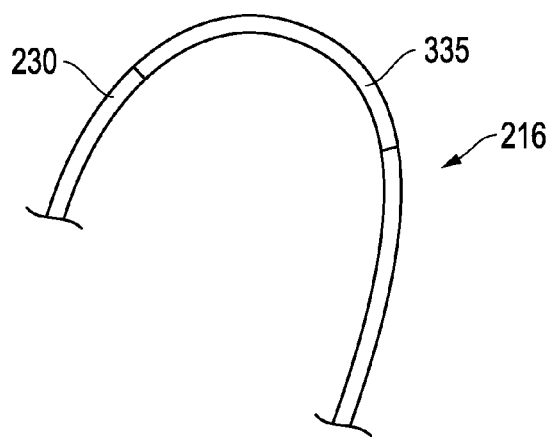
FIG. 3C is a side view of a portion of another alternate embodiment of a wearable piece in the form of a neckline positioned device.

Referring now to FIGS. 3A-3C side views of wearable communication piece 276, 295, 216 portions are depicted. More specifically, securing extensions 210, 220, 230 of single ear earpiece 276, dual ear earpiece 295, and neckwear 216 embodiment pieces are shown. However, with added reference to FIGS. 1 and 2A-2B, regardless of the specific piece morphology, each support mechanism 101-106 is configured to accommodate a wearable piece 276, 295, 216 in a direct manner at the discrete securing extension 210, 220, 230 thereof. Furthermore, the securing extension 210, 220, 230 doubles as an aid in securing the piece to a user at the ear, neck, wrist, etc., as detailed further herein. That is, when not being worn by a user, this same securing extension 210, 220, 230 is free and able to aid in supporting of the piece 276, 295, 216 to a support mechanism 101-106. Added degrees of display and organization are provided through such discrete portion accommodation at support mechanisms 101-106 of an organizer 100 in contrast to, for example, placement of entire pieces within a drawer.

Figure 9:
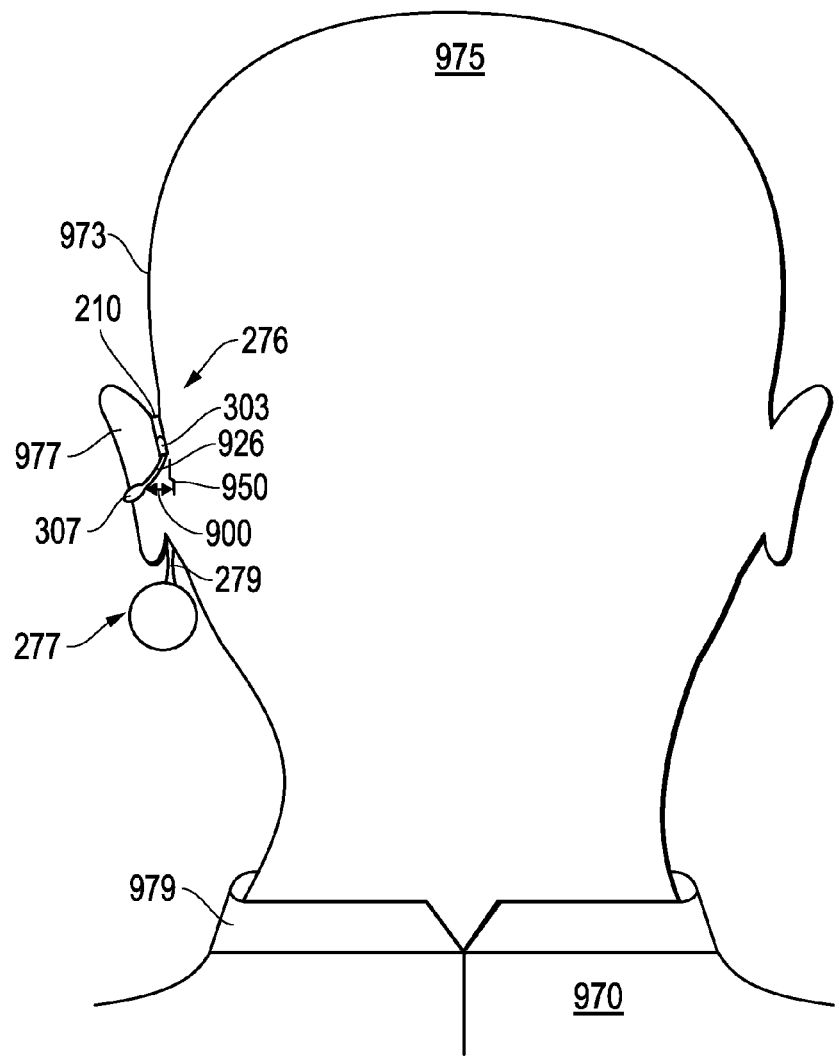
FIG. 9 is a front view of an embodiment of an electronic piece such as that of the embodiments of FIGS. 2A, 3A, 6A, 8A and others and depicted worn by a user.
Figure 10:
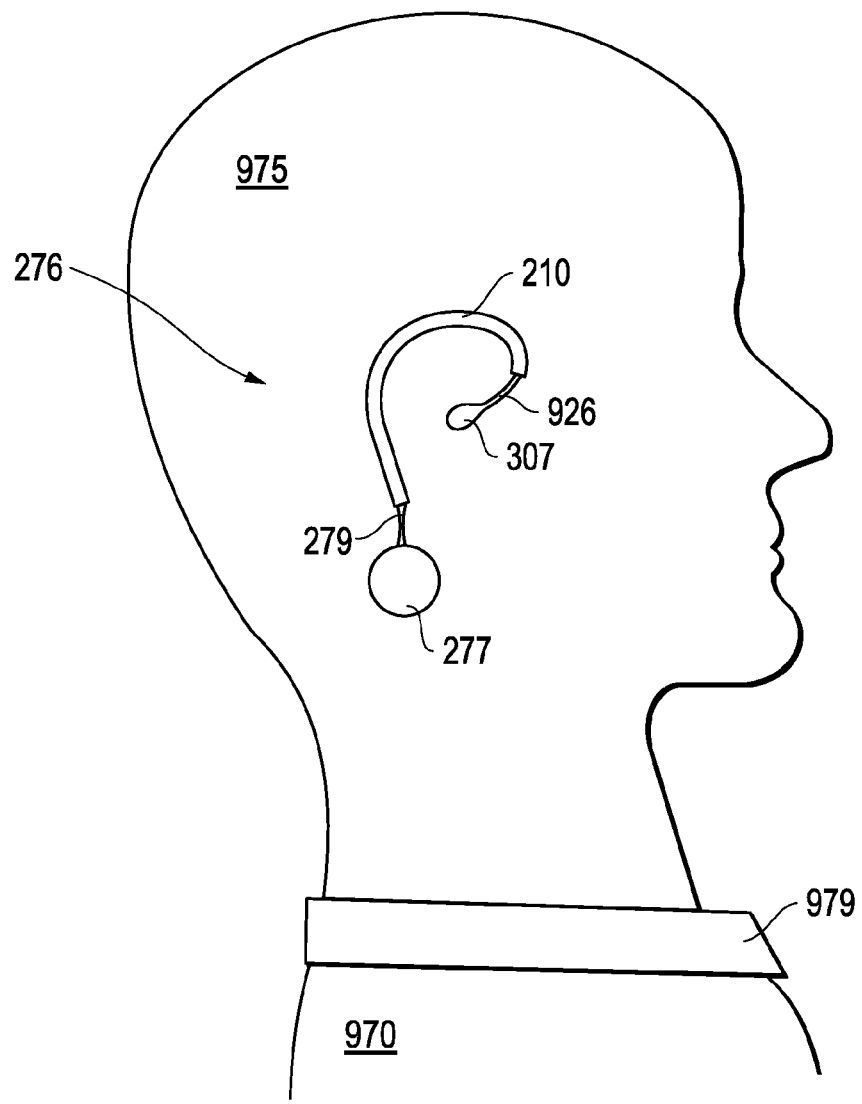
FIG. 10 is a side view of the wearable electronic piece of FIG. 9 as worn by the user.

As indicated above, FIGS. 3A and 3B depict portions of pieces 276, 295 which are configured for placement at a user's ear when being worn and used. Thus, the securing extensions 210, 220 are ear supports of a slim hook-like nature for positioning behind a user's ear (e.g. at the concha between the ear 977 and head 973 of the user 975 as shown in FIGS. 9 and 10). Alternatively, FIG. 3C depicts a portion of a piece 216 that is configured for placement around a neck of a user when being worn. Thus, the extension 230 is of a strap, cord, or other suitable wraparound variety.

With specific reference to FIG. 3A, and added reference to FIG. 2A, the securing extension 210 of the wearable communication piece 276 is highlighted. The extension 210 may serve as a platform to accommodate a host of features. These may include a speaker 307 or speaker assembly and actuator 303 emerging from a front thereof for earpiece functionality and ease of user manipulation, respectively. That is, unlike traditional earpieces, the actuator 303 is uniquely disassociated from the component casing 277 and electronic components it communicates with therein as detailed further below. Instead, it is strategically located as indicated to serve as the physically controlling interface for the user. With added reference to FIG. 8A, in a particularly ergonomically enhanced form, it is apparent that along the extension 210, the speaker 307 is accommodated from a front-most location as noted, with the distancing element 279 at the back thereof and the actuator 303 located therebetween (and toward the front of the extension 210 as noted above). Further, the component casing 277 and other portions of the piece 276 may also be provided apart from the extension 210. Nevertheless, with focus drawn to the securing extension 210, a charge region 305 is depicted which is located at the underside of the extension 210. Thus, the earpiece 276 may be well suited for recharging in conjunction with its 'hooked' placement at the support mechanism 101 of the organizer 100. That is to say, as the piece 276 is removed from wear and stored at the organizer 100, akin to conventional jewelry, a recharge thereof may begin to take place as detailed further below.

The charge regions 305, 315, 335 are configured to support inductive coupling with the support mechanism 101 for sake of providing a recharge to the pieces 276, 295, 216. With brief added reference to FIG. 5A, coil-based inductors 400, 500 internal to the mechanism 101 and piece 276, respectively, may be utilized in this manner. At the same time, rechargeable batteries and other electronic components may be housed at bulkier and ergonomically superior, heat-safe casing locations. However, the charge regions 305, 315, 335 of the embodiments shown are located at the extensions 210, 220, 230. Such locations may be more practical given the inherently securable nature of the extensions 210, 220, 230. Yet, at the same time, during recharge, the pieces 276, 295, 216 are not being worn by the user. Thus, the securable nature of the extensions 210, 220, 230 may now be taken advantage of for the sake of organized and secured storage, and without sacrifice to the ability to attain recharge.

With particular reference to FIG. 3B, the piece 295 is of a dual-ear headset variety. That is, one securing extension 220 is depicted accommodating an actuator 317 and speaker 319 for a user's ear. However, the assembly may include a duplicate of these same features corresponding to another ear of a user (see FIG. 2A). Thus, as noted, a dual ear, headset version of the piece 295 may be provided for example, to provide stereo quality sound. Of course, where properly configured, entirely separate but multiple single-ear pieces 276 may be simultaneously worn as an option for attaining stereo sound. Regardless, in the embodiment of FIG. 3B, the above described charge region(s) 315 may again be strategically located at the underside of the extension 220 to advance charging in conjunction with organized storage when in non-use by a user.

The embodiment of FIG. 3B is of a headset variety as noted above. However, dual-ear securing extensions 220 may also be utilized in other types of wearable pieces. For example, emerging photo or video eyewear, may make use of the depicted dual-ear extensions 220, as well as an extension in the form of a nose bridge. Once more, the availability of multiple extensions 220 may provide the advantage of multiple regions 315 as shown (and at a nose bridge in the case of eyewear). Thus, the degree of precision in managing recharge may be enhanced along with the rate of recharge, either of which may be particularly beneficial for such larger dual-ear devices (e.g. which may be of greater overall power and/or management requirements). Indeed, with added reference to FIG. 2A, in one embodiment of the organizer 100, a given support mechanism 104 may be tailored to such higher power device recharging. Along these lines, different support mechanisms 101, 104 may be morphologically tailored to substantially match the particular underside curvatures of differing form piece types. For example, one mechanism 101 may be configured to morphologically match certain securing extensions 210 of single ear piece types 276 and another 104 may be configured to match securing extensions 220 of others 295 (or a nose bridge as noted above). Morphological matching in this manner may be employed so as to increase surface interfacing between the mechanism 101, 104 and the underside of the corresponding extension 210, 220. Thus, enhanced security and power transfer may be achieved as detailed further below with reference to, for example, with reference to FIG. 4B.

With particular reference Co FIGS. 2B and 3C, a portion of a piece 216 is depicted which may be positioned at least partially at a neckline of a user during use. For example, the piece 216 may include a component casing which resembles a pendant in a manner that resembles a necklace when worn. Of course, the piece 216 also includes a securing extension 230 which resembles the strap, chain, cord, etc. of a conventional necklace. Yet, this extension 230 not only serves to secure the piece 216 in terms of wear on the user, but also may aid in positioning the piece 216 at a support mechanism 106 when not being worn or used.

In the embodiment of FIG. 3C, a charge region 335 of the extension 230, roughly opposite the suspended casing/pendant as shown in FIG. 2B, may be provided that is particularly configured to support electrical recharge. In one embodiment, the region 335 may include a less-flexible discrete morphological curvature akin to a single sawtooth hanger or indentation. Thus, enhanced security or maximized interfacing with the mechanism 106 thereat may be achieved.

Continuing with reference to FIGS. 3A-3C, the securing extensions 210, 220, 230 and/or regions 305, 315, 335 may include outer layers of polymer material or other substantially sweat-proof, water resistant materials. For example, in embodiments where inductive recharge is to be utilized, the avoidance of more conventional metal-based contacts for interfacing support mechanisms 101-106 may advantageous (see FIGS. 2A-2B). That is, as with bathroom electrical appliances such as electric tooth and facial brushes, pieces 276, 295, 216 are often exposed to moisture and debris that may affect a more traditional direct metal-based electronic coupling. Thus, while not necessarily in a bathroom setting, even brief wear by the user is likely to expose such pieces 276, 295, 216 to the user's own perspiration and accumulated skin particulate. This may especially be the case where the pieces 276, 295, 216 are similar to those depicted, which, per design, are likely to contact a user's skin directly during wear. Once more, such pieces 276, 295, 216 may be notable comfortable in an ergonomic sense and thus, well suited for long term or sport-type wear. As such, a sweat-proof configuration as described may be of unique benefit, particularly where inductive recharge is to be employed.

In one embodiment, the support mechanisms 101-106 may even be configured to enhance cleanliness of supported pieces (e.g. 276). For example, the mechanisms 101-106 may be outfitted with conventional UV, ionizing, germicidal ozone generating or other sanitizing capacity. Further, similar to a secured piece 276, these mechanisms 101-106 may be covered with an easily cleanable polymer layer. Indeed, the organizer 100 of FIG. 1 may even be outfitted with its own wet wipe dispenser. Along these lines, the covering layer for the mechanisms 101-106 may be readily disposable and replaceable. Additionally, in another embodiment, the outer surface of the mechanisms 101-106 may be of a coefficient of friction that is greater than that of the underside of supported pieces 276. Thus, as a user places the piece 276, the underside thereof may, to a certain degree, be intentionally cleaned by the outer surface of a mechanism 101-106 during placement. The user is then able to later wipably clean the mechanism 101-106 or replace the disposable cover thereto as desired.

Figure 4A:
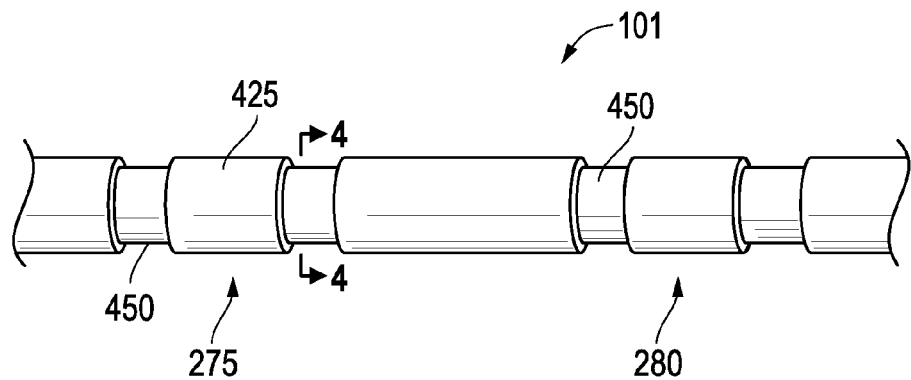
FIG. 4A is a perspective view of an embodiment of a support mechanism for accommodating wearable pieces.
Figure 4B:
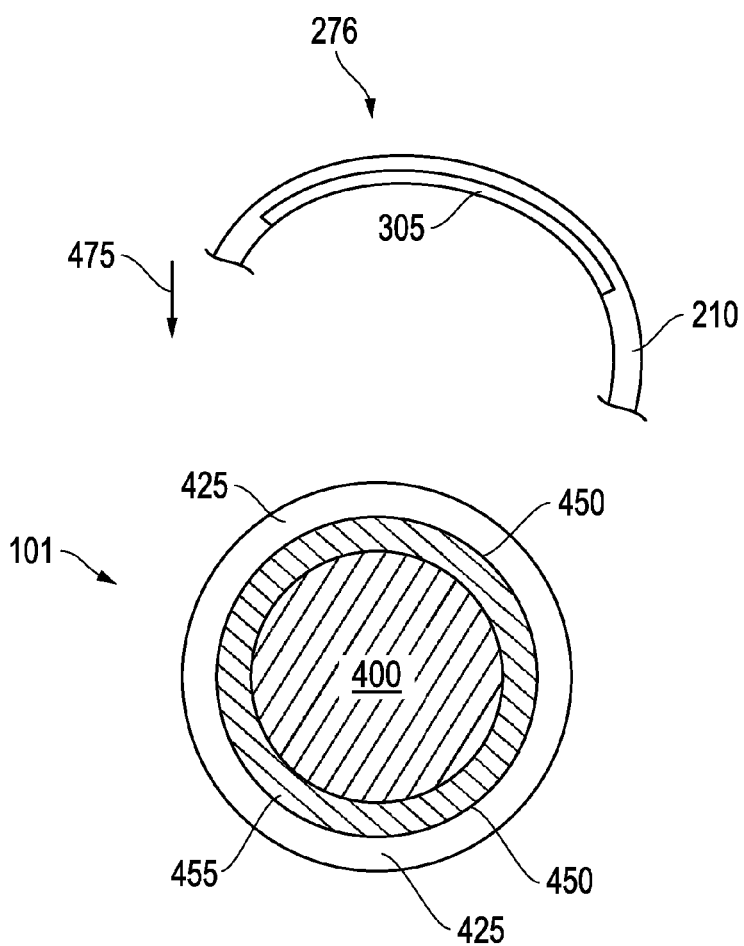
FIG. 4B is an enlarged partially sectional view of the mechanism taken from 4-4 of FIG. 4A for accommodating a securing extension of the earpiece of FIG. 3A.

Referring now to FIGS. 4A-4B, perspective and sectional views of an embodiment of a support mechanism 101 are depicted for accommodating wearable pieces (e.g. 276). More specifically, FIG. 4B is an enlarged partially sectional view of the mechanism 101 taken from 4-4 of FIG. 4A and for accommodating a securing extension 210 of the earpiece 276 of FIG. 3A.

With specific reference to FIG. 4A, and added reference to FIG. 2A, the support mechanism 101 is of the rod-shaped variety as noted above. In this particular embodiment, the mechanism 101 is also configured with pairing locations 275, 280. These locations 275, 280 each include a pair of defined recesses 450 at which a pair of wearable communication pieces (e.g. 276) may be accommodated between isolating structure 425 of the mechanism 101. For example, pairs of wearable earpieces 276, 281 may be positioned at these locations 275, 280 of an organizer 100. More specifically, as alluded to above, such earpieces 276, 281 may be equipped with a securing extension 210 in the form of a stable, largely shape-retaining, wrap-around 'ear hook' (or ear support). This extension 210 may serve to secure an earpiece 276 at a user's ear when in use and also be well suited for flexible but secure placement at the support mechanism 101 when not in use.

Referring now to FIG. 4B, an exploded partially sectional view of the support mechanism 101 taken from 4-4 of FIG. 4A is shown. The mechanism 101 is configured to accommodate a discrete portion of the earpiece 276, namely its securing extension 210. That is, as the piece 276 is 'hooked' or hung about the mechanism 101 via movement of the extension 210 in the direction of arrow 475, a charging device may be utilized for recharging of the earpiece 276. More specifically, in the embodiment shown the charging device is an inductor 400 such as may render a magnetic field. Thus, a charge region 305 of the piece 276, brought into the vicinity thereof (see arrow 475), may attain recharge by way of its own internal inductor 500 configured to convert the magnetic field into usable current (see FIG. 5A). As such, a functional transformer is rendered.

This type of electromagnetic field conversion for sake of battery recharge may be heat generating in nature due to the ferrite cores, coils and other features of the inductors 400, 500 described below. Nevertheless, due to the configuration of the depicted piece 276, heat sensitive casing components are safely displaced to a location (e.g. at 277 of FIG. 2A), removed from the heat prone location of the charge region 305, mechanism 101 and interfacing inductors 400, 500 thereat (see also FIG. 5A). Once more, as indicated further herein, the arcuate shape of the extension 210 may be of a tailored morphological matching to that of the outer surface of the mechanism 101. Thus, a maximized interfacing and efficiency of inductive recharge may be attained. Indeed, the construction of the extension 210 may be flexibly conformal relative the mechanism 101 so as to support placement at different sized user ears as well as a tight, substantially maximized interfacing fit upon securing to the mechanism 101, thereby even further enhancing efficiency of power transfer/recharge. Further, even when not recharging, a degree of magnetic interaction between the inductors 400, 500 may be sufficient to enhance stability of the piece 276 in place at the mechanism 101.

In certain embodiments, depending on the particular dimensions at the interface, shielding, charge levels and other factors, the recharging may take place in a slower fashion in contrast to a more conventional metal-based plug-in, for example. From a heat-safe perspective, relative casing 277 components this may be intentional as alluded to hereinabove (see FIG. 2A). Nevertheless, such charging rates may be more than adequate for supplying a sufficient overnight full-recharge to such pieces 276. That is, as a practical matter, a user is likely to remove pieces at least for sleep periods, as with eyewear and other apparel accessories. Thus, even where recharge is of an intentionally slower fashion, for example, to minimize heat, the relatively low power pieces may nevertheless acquire more than adequate recharge with conventional state of the art batteries available.

Additionally, the efficiency of the recharge may be enhanced where the physical interface between the earpiece 276 and the support mechanism 101 is maximized. For example, as noted above, where the securing extension 210 and the mechanism 101 are morphologically tailored in a substantially matchable fashion, the interfacing of the charge region 305 relative the underlying inductor 400 may be maximized. By way of more specific examples, a substantially matchable character may be displayed where the support mechanism 101 and the extension 210 physically share a substantially uninterrupted interface of more than about ¼ of an inch to upwards of an inch or more. Further, these features 101, 210 may be of substantially similar radiuses, for example, where both are between about ½ an inch and two inches in radius.

The substantially matching morphological character of the noted features 101, 210 relative one another may be attained in a conformal manner. For example, the extension 210 may be of a largely polymeric conformal supportive structure that is of a slightly smaller initial radius than the support mechanism 101. However, it may be of an expansive character and configured to take on the substantially matching morphology upon interfacing with the slightly larger radiused support mechanism 101. Indeed, in one embodiment, the mechanism 101 itself may include locations that compressibly or conformally receive the extension 210 so as to provide the substantially matching character in a biasing or spring-like fashion. For example, such compressibly retentive features may be readily incorporated into embodiments of the support mechanism 101 as those depicted in FIG. 4A detailed above and/or FIG. 5A described further below.

With a substantially matching features 101, 210 available for enhanced interfacing during recharge, heat commensurate with inductive recharging in particular may be kept at a minimum without significantly hampering efficient overnight charging. Thus, in combination with the utilization of a displaced casing 277, an effective and practical manner of recharge may be achieved without measureable effects on, or impairment of, casing components (see also FIGS. 2A, 8A). With particular focus on the earpiece 276, a wearable is provided that securely positions interchangeably between both the user and the support mechanism 101 with a similar level of security in either case. That is, the diameter of the mechanism 101 is likely to be similar to that of a human ear at the underside or 'concha' thereof. Further, from a surface-based standpoint, a substantially maximized amount of interfacing may be achieved for sake of recharge efficiency and casing component protection.

Continuing with reference to FIG. 4B, the inductor 400 may be of conventional inductive coil-based construction with a protective layer 455 disposed thereabout which is of a polymer or other suitable material. Thus, in conjunction with the layer protected charge region 305, a moisture and debris-resistant interface for recharging the earpiece 276 is provided. Once more, with added reference to FIG. 5A, the extension 210 of the piece 276 is specifically located at a recess 450 of the support mechanism 101. Thus, guided placement of the earpiece 276 about the inductor 400 and adjacent isolating structure 425 may be attained.

Figure 5A:
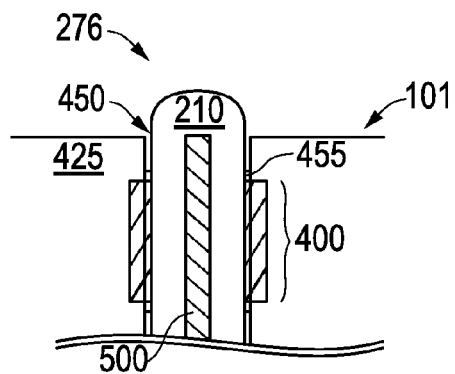
FIG. 5A is a front sectional view of an embodiment depicting a charging device relative the support mechanism and accommodated earpiece of FIG. 3A.
Figure 5B:
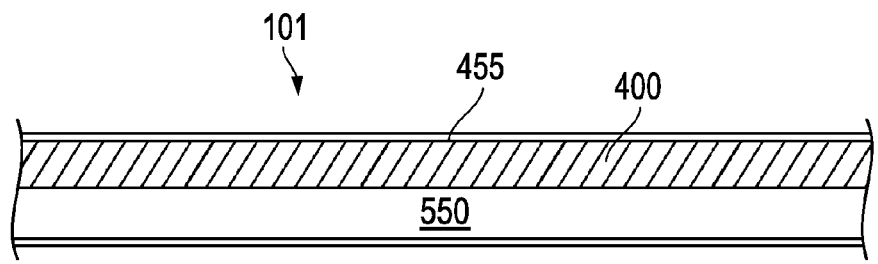
FIG. 5B is a side cross-sectional view of an alternate embodiment of support mechanism with charging device disposed therein.
Figure 5C:
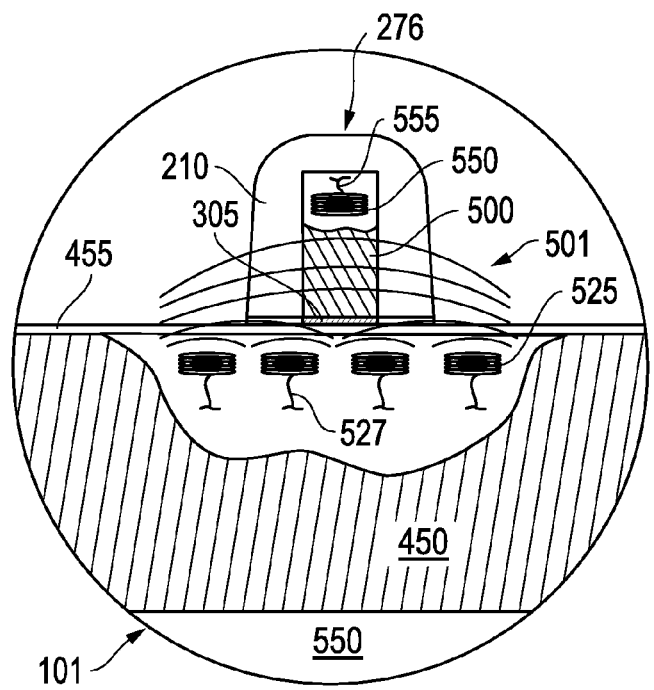
FIG. 5C is a schematic sectional view of an embodiment of the charging device of FIG. 5B employing an inductive field for charge of the earpiece.

Referring now to FIGS. 5A-5C, particular embodiments of inductive interfacing between coil-based inductors 400, 500 of the support mechanism 101 and a corresponding extension 210 are detailed. More specifically, FIG. 5A is a front sectional view of the support mechanism 101 with an internally disposed charging device in the form of a noted inductor 400. Thus, an earpiece embodiment 276 such as that of FIG. 4B may be accommodated for organized display and recharge. FIG. 5B depicts a side cross-sectional view of an alternate embodiment of support mechanism 101 of uniform construction with elongated charging device 400 disposed therein. FIG. 5C is a sectional view of an embodiment of underlying inductor 400, 500 components so as to schematically represent an inductive field 501 and nature of such recharging.

With specific reference to FIG. 5A, a front sectional view is depicted of this interfacing of internal coil-based inductors 400, 500. In this view, the securing extension 210 is only partially cross-sectional such that its underlying inductor 500 is shown covering over the support mechanism 101 there-below (though a more fully cross-sectional depiction is shown at FIG. 5C). In the depiction of FIGS. 5A-5C, one inductor 400 is the charging device provided via the support mechanism 101 whereas the other 500 is provided via the charge region 305 of the earpiece 276 (see FIG. 4B).

In the embodiment of FIG. 5A, the positioning of the securing extension 210 within the recess 450 is apparent. Once more, the surrounding isolating structure 425 may be of greater electrically insulating dielectric character as compared to layer materials of the protective layer 455 and/or the surface of the charge region 305 (see FIG. 4B). Indeed, along these lines, in the embodiment of FIG. 5A, internal inductors 400 of the support mechanism 101 may be of discrete construction for individual placement adjacent each recess 450 of the mechanism 101. Thus, an efficient and isolated recharge may take place on an accommodated piece by piece basis.

In one embodiment, the inductors 400 of the support mechanism 101 may extend vertically into the body of the isolating structure 425, with some degree of recess exposure, so as to increase the area of interface between the adjacent inductors 400, 500. Thus, the rate and degree of power transfer may be enhanced. Of course, as detailed below, alternative less discrete pairings of inductors 400, 500 may also be utilized. Further, segregated recesses 450 may be utilized in conjunction with an elongated inductor 400, such as the one depicted in the embodiment of FIG. 5B, for example, for ease of use and/or manufacturability.

As indicated above, the positioning of the earpiece 276 is guided by the size and/or shape of the depicted recess 450. Thus, in one embodiment, the dimensions and morphology of the recess 450 and the accommodated securing extension 210 may be configured in light of one another. That is, these features 450, 210 may be configured with a key-like fitted matching for sake of interfacing. As such, incompatible pieces may be largely blocked from recharge or organized storage at the location of the recess 450. Thus, in addition to a substantially matching interfacing, the advantage of a mechanically selective type of plug-in interfacing of piece 276 and recess 450 would be provided, without necessarily requiring the use of more traditional metal-based contacts. Thus, as noted above, exposure to moisture and other debris may remain of insignificant concern.

Continuing now with reference to FIG. 5B a side cross-sectional view of an alternate embodiment of the support mechanism 101 is shown. In this embodiment, the mechanism 101 is of a smoother straight-line configuration without predefined segregated recesses 450 of any significant depth. Additionally, rather than utilize a plurality of more discrete inductors 400, along the lines of the embodiment of FIG. 5A, a single elongated version of an inductor 400 is disposed below the protective layer 455. Thus, in this embodiment, less precise positioning of the piece 276 is required for sake of functional recharge interfacing. Similarly, akin to certain wireless inductive charging pads, the single elongated support mechanism 101 and rod-shaped inductor 400 may accommodate any practical number of wearable communication pieces 276.

In the embodiment of FIG. 5B, the internal elongated inductor 400 is positioned nearer the likely interface location of the support mechanism 101 (e.g. at its top, from where a piece 276 is likely to be hung). Thus, internal space 550 of the mechanism 101 is available for other functional components. For example, insulating material may be located in the space as an aid to minimizing overall heat buildup throughout a charging organizer 100, such as the one depicted in FIG. 1. As such, an accommodated piece 276 and heat sensitive components thereof may be even further safeguarded. Indeed, even in a single support mechanism 101 embodiment such insulating in the space 550 would be located between the inductor 400 and the heat sensitive component casing 277 therebelow (see FIG. 8A).

Referring now to FIG. 5C, a more fully cross-sectional depiction of a piece 276 accommodated at the support mechanism 101 is shown. In this view, the coil-based inductive recharge is depicted in a manner that schematically reveals the interaction between the inductors 400, 500 during recharge. As a matter of orientation, polymeric material at the underside of the earpiece charge region 305 is apparent as well as at the outer surface of the mechanism protective layer 455. However, at either side of these material portions, are the interfacing inductors 400, 500 for sake of recharge via wireless power transfer.

In the embodiment of FIG. 5C, the support mechanism's inductor 400 is outfitted with a series of primary coils 525, though more discrete, pairing location coils 525 may be utilized for embodiments such as those of FIG. 5A. Similarly, the inductor 500 of the piece 276 is outfitted with a secondary coil 550. Thus, upon securing at the support mechanism 101, the secondary coil 550 is well positioned for wirelessly obtaining power (inductively imparted voltage) from the primary coils 525.

The embodiment of FIG. 5C depicts wireless power transfer to the piece 276 via a magnetically induced inductive field 501 generated by the primary coils 525 in detectable immediate proximity of the secondary coil 550. A variety of different electronic architectural designs may be employed for generation of such an inductive field 501 from which a conventional secondary coil 550 may extract and transfer power. The electronic architectural design of FIG. 5C is similar in construct to that detailed in U.S. Pat. No. 6,906,495. However, others may be utilized such as designs detailed in U.S. Pat. No. 7,239,110; US 2006/0043927; U.S. Pat. Nos. 7,109,602; 7,042,196; 6,005,304; 7,462,951; US 2007/0141860 and others. Yet, regardless of the particular design selected, a fundamental principle is employed whereby primary and secondary circuits (i.e. coils 525, 550) of a transformer may be separated by a short distance yet remain magnetically coupled for purposes of power transfer.

The primary coils 525 may be equipped with primary extensions 527 that are electronically coupled to circuitry within the support mechanism 101 and, for example ultimately to the control unit 150 of FIG. 1 for managed recharge as detailed herein. Thus, a conventional wall socket may serve as the source for the recharge on a near continuous basis, depending on management parameters of the control unit 150. Similarly, a secondary extension 555 from the secondary coil 550 may deliver power for recharge to a battery within a component casing 277 (see FIG. 2A).

Continuing with reference to FIG. 5C, the field 501 may be generally considered 'near field'. That is the effectiveness of the field 501 may rapidly dissipate moving away from the primary coils 525. Thus, concerns over dampening, diffusion, atmospheric absorption and other standard energy losses may be largely insignificant. Further, safety concerns may be minimized in this manner as well as through construction of the organizer 100 and management through the control unit 150. For example, power transferable engagement may only be selectively activated only where a compatible piece 276 is in securable proximity of the mechanism 101. Further, the organizer 100 itself may be of a shielded cabinet design as shown in FIG. 1 with a host of shielding available at cabinet doors 125, drawers or other suitable locations.

In an embodiment such as that of FIG. 5A, the shielding isolating dielectric structure 425 may provide a degree of collimating relative the field 501. Furthermore, the induction itself may be of a resonant variety. That is, the primary coils 525 may be configured to 'tunnel' the field 501 at a particular frequency wheares the secondary coil 550 is configured to resonate at about the same frequency. Thus, efficiency of voltage transfer thereto may be enhanced.

As an alternative to induction as detailed hereinabove, radio wave transmission, microwave transmission and laser beaming may even be utilized. Once more, a more conventional, hard contact-based electrical power transfer may even be utilized as described below.

Figure 6A:
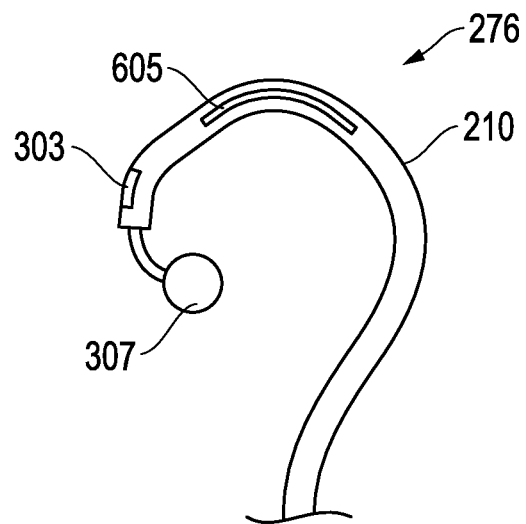
FIG. 6A is a side view of an alternate embodiment a single ear earpiece configured for electrical contact based recharge.
Figure 6B:
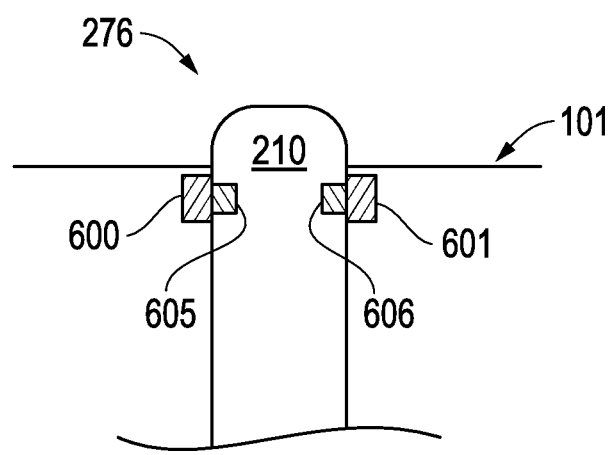
FIG. 6B is a front sectional view of support mechanism and charging device for secure accommodation and electrical contact-based recharge of the earpiece of FIG. 6A.

Referring now to FIGS. 6A and 6B, a more traditional plug-in type of recharge embodiment is depicted. Specifically, FIG. 6A depicts a side view of an embodiment a single ear earpiece 276 configured for electrical contact based recharge. That is, in contrast to the embodiment depicted in FIG. 3A, an inductive type of charge region 305 is replaced with one that is a metal-based contact 605 such as copper. Further, while the securing extension 210 remains a suitable platform for the speaker 307 and/or an actuator 303, it may also be of a more rigid construction and the contact 605 located at a side thereof. This may suit an embodiment where the contact 605 is of a less flexible construction. Additionally, placement of contacts 605 at the sides of the piece 276 may keep them open and less likely pressed over the user's ear on a near continuous basis during use. Thus, user perspiration and debris may be less of a factor in diminishing the overall life of the contact 605.

As shown in FIG. 6B, the piece 276 is plugged into the support mechanism 101 for recharge. More specifically, the contacts 605, 606 at each side of the extension 210 are aligned with those 600, 601 of the mechanism 101 akin to a traditional electrical plug-in. Thus, recharge of a battery within the casing 277 may be attained via conventional means (see FIG. 2A).

Figure 7:
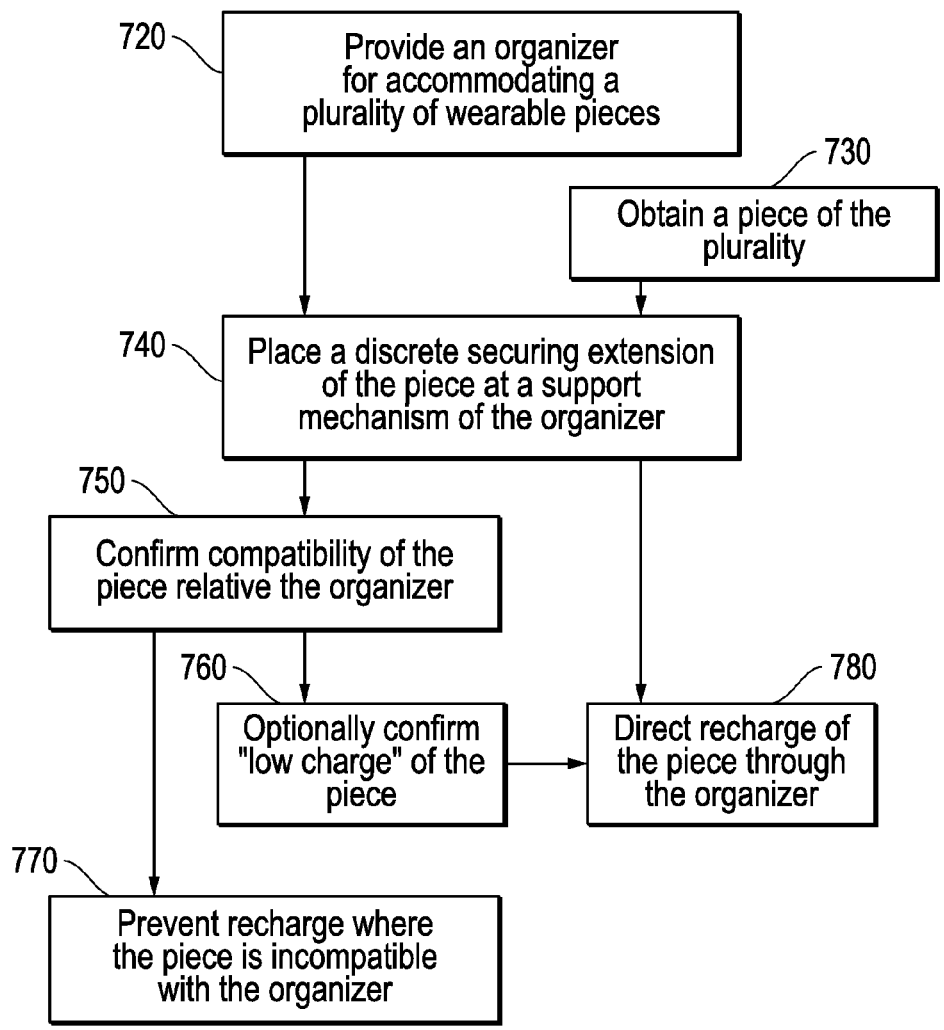
FIG. 7 is a flow-chart summarizing an embodiment of utilizing an organizer to accommodate a plurality of wearable wireless pieces and selectively manage recharge thereof.

Referring now to FIG. 7, a flow-chart is depicted summarizing an embodiment of utilizing an organizer such as that of FIG. 1, to accommodate and manage a plurality of wearable electronic, wireless communication or other pieces. Namely, as indicated at 720 and 730, the organizer is provided along with apiece that is to be accommodated. Thus, as noted at 740, a discrete portion of the piece may be placed at a support mechanism of the organizer, such as where a securing extension is used to secure a piece to a support mechanism as detailed hereinabove.

With pieces accommodated by the organizer, recharge may take place as indicated at 780. However, a control unit of the organizer may also be utilized in managing and/or allowing recharge. For example, the compatibility of each accommodated piece may be confirmed in advance as indicated at 750. In fact, with communicative capacity available between a processor of the control unit and an accommodated piece, a level check for "low power" or "no power" may also optionally take place in advance of recharging as indicated at 760. Such a check may serve as a power savings aid. Further, as noted at 770, recharge may be prevented altogether, where the accommodated piece is incompatible with the organizer, based on any given number of predetermined manufacturer settings. All in all, a uniquely intelligent manner of recharge is provided in terms of real time compatibility and power level checks for a heretofore unseen manner of recharge in terms of the morphological suspended engagement utilized.

Management of recharge may further entail protocols relating to a variety of factors and input. For example, the control unit 150 of FIG. 1 may be preprogrammed to monitor organizer heat and adjust recharge accordingly. Indeed, such monitoring may be on a support mechanism by support mechanism basis. Similarly, tracking and monitoring on a piece by piece basis may be undertaken so as to retain a historical record of recharge, for example to determine reliability of different piece types or brands.

Figure 8A:
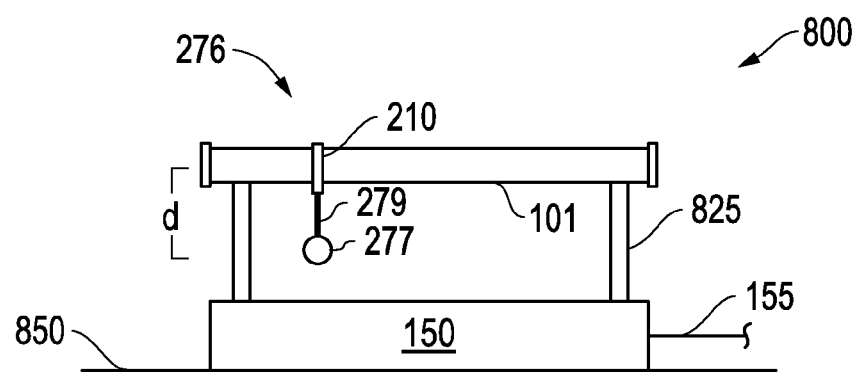
FIG. 8A is an alternate embodiment of an organizer in the form of a horizontal surface mounted unit.
Figure 8B:
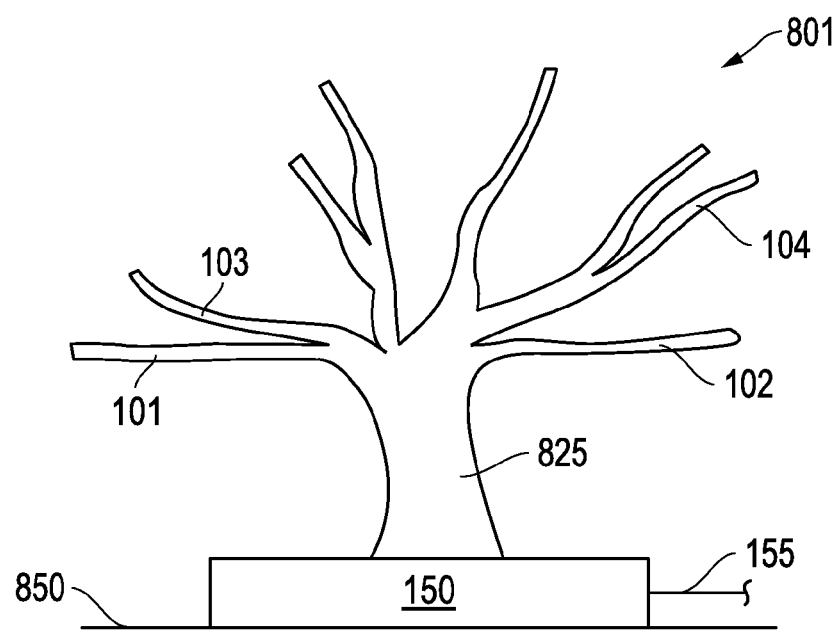
FIG. 8B is another alternate embodiment of an organizer in the form of a horizontal surface mounted unit utilizing open-ended support mechanisms.

Referring now to FIGS. 8A and 8B, alternate embodiments of organizers 800, 801 are depicted which take on various artistic forms, including a sleek or modern look as shown in FIG. 8A versus the 'tree-like' sculpting of FIG. 8B. From a more functional standpoint however, the organizers 800, 801 are provided as horizontal surface mounted units. That is, as opposed to mounting on a wall or other vertical surface, the units 800, 801 are configured for positioning at a horizontal surface 850 such as a bedside table, dresser or other suitable location. Indeed, the control unit 150 may be incorporated into a support base at the surface 850 for either embodiment, with a cord 155 provided for plugging into a standard wall socket. Further, the units 800, 801 make use of rod-shaped support mechanisms 101-104, much as the embodiment of FIG. 1. However, given that the mechanisms 101-104 are more directly raised over the control unit 150, as opposed to housed within a larger cabinet as in the embodiment of FIG. 1, vertical extensions 825 may extend from the control unit 150.

With particular reference to FIG. 8A, the support mechanism 101 is of a single open variety. That is, an enclosed plurality of adjacent support mechanisms are not utilized as in the embodiment of FIG. 1. Thus, the displaced component casing 277 of a secured piece 276 may advantageously avoid concentrated exposure to induction produced heat from any adjacent support mechanisms as well as any heat buildup within an enclosure. Once more, in this particular view, the above described displacement relative the depicted mechanism 101 is particularly apparent. Indeed, a substantial displacement (d) between the casing 277 and potential heat sensitive components thereof is shown relative the mechanism 101 and an inductor housed within the extension 210 (and/or the mechanism 101 thereunder). As detailed above, this may translate to a heat safe distance of at least about 1.5 inches, for example as facilitated by a distancing element 279.

Continuing with reference to FIG. 8A, two separate vertical extensions 825 extend from the base control unit 150 to supportively secure each end of the rod-shaped support mechanism 101. This is done in such a manner that the mechanism 101 is largely closed-ended similar to the mechanisms 101-104 of the embodiment of FIG. 1. So, for example, where a normally closed-loop piece 216, such as the necklace type of FIG. 2B, is to be stored at the organizer 800, it's extension strap may preferably be unfastened and opened prior to placement about the mechanism 101 (just as would be the case prior to placement about a user's neck).

Of course, another support mechanism may be added to the base control unit 150 adjacent thereto. For example, the organizer 800 may take on the appearance of gymnastic-type uneven bars for sake of stair step presentation. In this manner a multi-level organizer 800 of support mechanisms 101 may be provided which are set apart from one another, with an offset and unencumbered manner of display for user accessibility of pieces.

Alternatively, the embodiment of FIG. 8B reveals open-ended support mechanisms 101-104. For example, a single central vertical extension 825 is provided from which the mechanisms 101-104 emerge in an open-ended fashion. Thus, placement of a necklace type piece 216 as depicted in FIG. 2B may more directly involve the hanging of the piece 216 about the end of a support mechanism 101-104 without the requirement of unfastening and refastening the strap. Such placement more closely resembles the manner of securing the piece 216 to hook-shaped support mechanisms 105, 106 depicted in FIG. 2B. However, in contrast to the hook-shaped embodiments of FIG. 2B, the embodiment of FIG. 8B, affords additional footspace for several pieces per open-ended, rod-shaped support mechanisms 101-104.

Of course, any number of different presentation and functional stylings may be utilized in combination when constructing an organizer 100, 800, 801. Aside from being wall or horizontal surface mounted as indicated, support mechanisms may be open-ended, closed-ended, rod-shaped, hook-shaped, or any practical combination thereof incorporated into a given organizer. Once more, accommodated pieces may be of any user compatible morphology. So long as the organizer is equipped with a support mechanism(s) having capacity to support discrete securing extensions of wearable electronic or communication pieces, organizational, recharging, and other advantages heretofore unseen may be achieved.

Embodiments described hereinabove provide an organizational system directed at wearable electronic pieces. These may include wireless jewelry or other communicative type embodiments, often referred to as "wearables". Embodiments of the organizer allow for a growing accessory collection may be relieved of the requirement for a dedicated recharger with each and every piece that is added to the collection. As a result, some of the same un-encumbering, freedom-of-movement, type of benefits to wireless technology that are appreciated during use and wear may be extended to time periods when such pieces are not being worn. Indeed, the benefit to such organization is particularly noticeable for a growing collection of wearable wireless pieces which, unlike conventional jewelry, face the added circumstance of a growing jumbled mess of wires in absence of such an organizer.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, embodiments described herein detail certain types of mechanisms with open or closed-ended, rod or hook-shaped supports, that are configured to directly support a discrete portion of a wearable wireless communication piece. However, in alternate embodiments a small pocket, flexible loop or other form of sustaining retainer shape may be utilized for direct support of a discrete securing extension of such pieces. Furthermore, with added reference to FIGS. 9 and 10, as a matter of further enhancing ergonomics, in an ear piece embodiment 276 the speaker 307 may intentionally be kept off of the user's ear 977 with a flexible speaker support 926 (e.g. with a user-defined separation 900 of up to about 0.5 inches maintained between the speaker 307 and the user's ear 977 when worn). In such an embodiment, the speaker 307 may be equipped with hypersonic sound delivery capacity to direct the sound across the separation 900. The foregoing description should not be read as pertaining only to the precise structures described and shown in the accompanying drawings, but rather should be read as consistent with and as support for the following claims, which are to have their fullest and fairest scope.

I claim:

1. An ergonomic single ear ear wear piece of enhanced comfort for long-term wear, the piece comprising:
   a hook shaped securing extension for positioning behind a user's ear and securing the piece thereat;
   an actuator at a location of said extension to serve as a physically controlling interface for the user;
   a speaker assembly for delivering sound to the user's ear, said speaker assembly supported by said extension from a location at one side of the actuator location;
   a distancing element coupling to said extension from a location at an opposite side of the actuator location; and
   a casing coupled to said distancing element and of a bulk for housing a plurality of electronic components, the bulk exceeding that of said extension and said distancing element, said distancing element to displace said casing to a location between the ear and a neckline of the user when the piece is secured.

2. The ear wear piece of claim 1 wherein the plurality of electronic components includes one of a focused microphone and a rechargeable battery.

3. The ear wear piece of claim 2 wherein the rechargeable battery is inductively rechargeable.

4. The ear wear piece of claim 1 wherein said distancing element is between about 0.25 inches and about 5.0 inches in length and less than about 0.25 inches wide.

5. The ear wear piece of claim 1 wherein said securing extension is less than about 0.25 inches in width.

6. The ear wear piece of claim 1 wherein said securing extension is of a moisture resistant construction with an underside portion morphologically tailored to substantially match a surface of the position behind the ear at a concha thereof when the piece is secured.

7. The ear wear piece of claim 1 wherein the speaker location and the actuator location of said securing extension are at a front portion of said extension and the opposite side of said securing extension for the coupling of said distancing element is at a back portion of said extension.

8. The ear wear piece of claim 1 wherein the location of said securing extension for supporting said speaker assembly is configured to maintain a separation of up to about 0.5 inches between said speaker assembly and the user's ear when the piece is secured.

9. The ear wear piece of claim 8 wherein said speaker assembly is equipped with hypersonic sound delivery capacity to direct the sound across the separation to the user's ear during the delivering of the sound.

10. An ergonomic wearable electronic ear wear piece of enhanced comfort for long-term wear, the piece comprising:
    at least one hook shaped securing extension for positioning behind an ear of a user to at least partially secure the piece thereat;
    at least one actuator accommodated by said extension, said actuator to serve as a physically controlling interface for the user;
    a speaker assembly accommodated by said extension for delivering sound to the user's ear;
    a distancing element coupled to said extension; and
    a casing coupled to said distancing element and of a bulk for housing a plurality of electronic components, the bulk exceeding that of said extension and said distancing element, said distancing element to locate said casing away from the ear to a position exclusively between the ear and a neckline of the user when the piece is at least partially secured.

11. The wearable piece of claim 10 wherein the plurality of electronic components includes an inductively rechargeable battery.

12. The wearable piece of claim 10 wherein said at least one securing extension is less than about 0.25 inches in width and said distancing element is between about 0.25 inches and about 5.0 inches in length and less than about 0.25 inches wide.

13. The wearable piece of claim 1 wherein said speaker assembly is accommodated by said extension from a first location thereof, said actuator is accommodated by said extension at a second location thereof and said distancing element is coupled to a third location of said extension, the second location being at a position between the first and third locations along said extension.

14. The wearable piece of claim 13 wherein the first and second locations are substantially at a front of said extension and the third location is substantially at the back of said extension.

15. The wearable piece of claim 13 wherein the first location is configured to maintain a separation between said speaker assembly and the user's ear when the piece is secured, said speaker assembly equipped with hypersonic sound delivery capacity to direct the sound across the separation to the ear during the delivering of the sound.

16. A method of utilizing an ergonomic wearable electronic ear wear piece of enhanced comfort for long-term wear, the method comprising:
   at least partially securing the piece at a user's ear with at least one hook shaped securing extension being positioned at least partially behind the ear;
   manipulating an actuator at a front of the extension to electronically communicate with one of a plurality of electronic components in a casing coupling to the extension, the casing of a bulk exceeding that of the securing extension and a distancing element that provides the coupling and positions the casing at a location away from the ear and exclusively between the ear and a neckline of the user when the piece is secured; and
   delivering sound to the user's ear with a speaker assembly accommodated by the securing extension.

17. The method of claim 16 further comprising inductively charging a battery of the plurality of electronic components prior to said securing.

18. The method of claim 16 further comprising maintaining a user-defined separation between the speaker assembly and the user's ear, said delivering further comprising employing hypersonic sound delivery capacity of the speaker assembly to direct the sound across the separation.

19. The method of claim 17 wherein said delivering further comprises delivering stereo sound by directing sound to another of the user's ears with another speaker assembly accommodated by another hook shaped securing extension positioned at least partially behind the other ear of the user.

20. The method of claim 19 wherein the other hook shaped securing extension is coupled to another distancing element for coupling to one of the casing and another separate casing accommodating another plurality of electronic components, the other separate casing of a bulk exceeding that of the other securing extension and the other distancing element, the other distancing element positioning the other casing at a location away from the ear and exclusively between the ear and a neckline of the user.

* * * * *

UNITED STATES PATENT AND TRADEMARK OFFICE
CERTIFICATE OF CORRECTION

PATENT NO. : 9,438,984 B1
APPLICATION NO. : 13/943071
DATED : September 6, 2016
INVENTOR(S) : Ryann Page 1 of 1

It is certified that error appears in the above-identified patent and that said Letters Patent is hereby corrected as shown below:

In the Claims

Claim 13, Line 1. The reference "claim 1" should read -- claim 10 --

Signed and Sealed this
Twenty-third Day of May, 2017

Michelle K. Lee
*Director of the United States Patent and Trademark Office*